Nov. 5, 1940.  C. E. KOLB  2,220,159
PRICE COMPUTING MECHANISM
Filed April 22, 1937  5 Sheets-Sheet 2
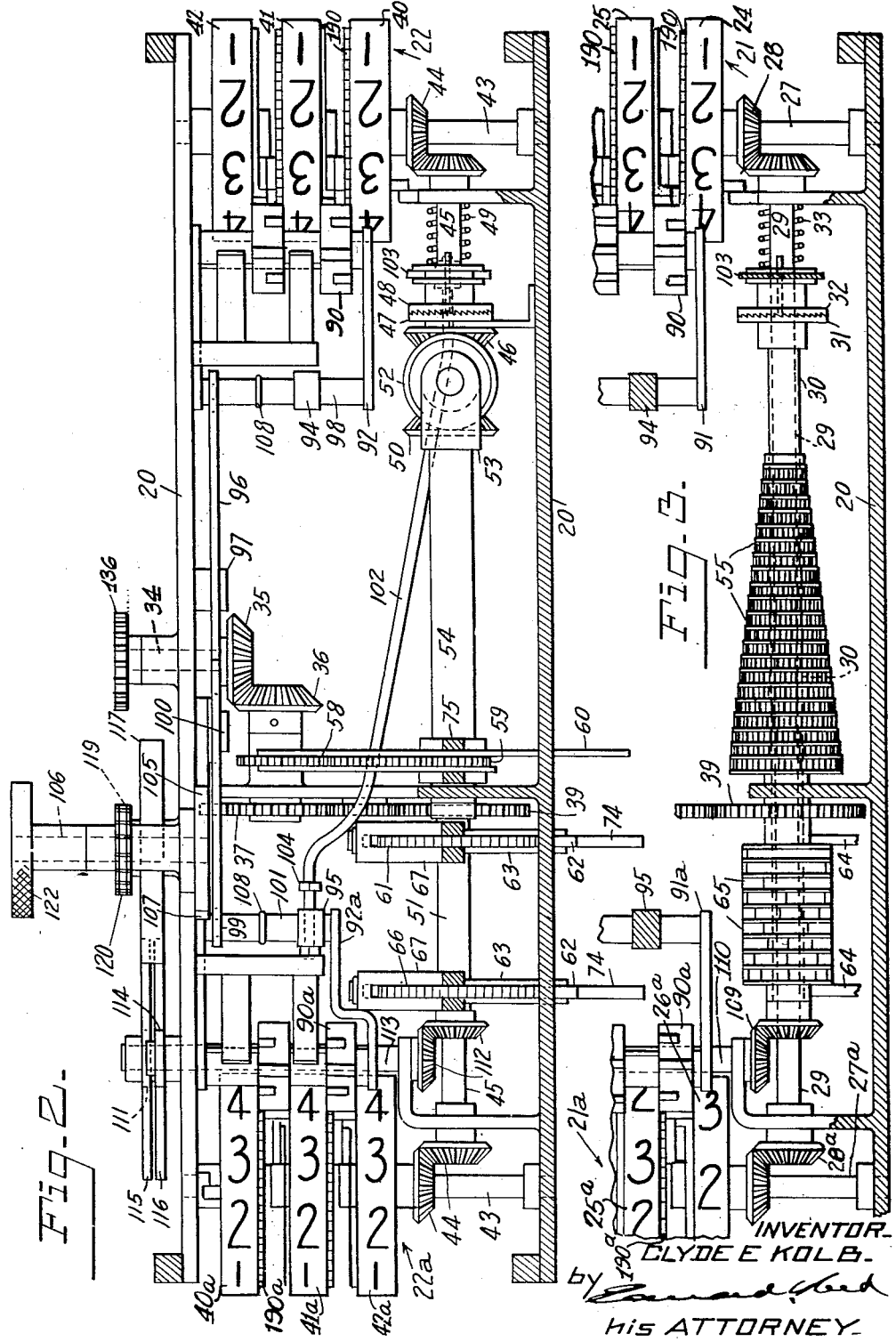
INVENTOR.
CLYDE E. KOLB.
by
his ATTORNEY.

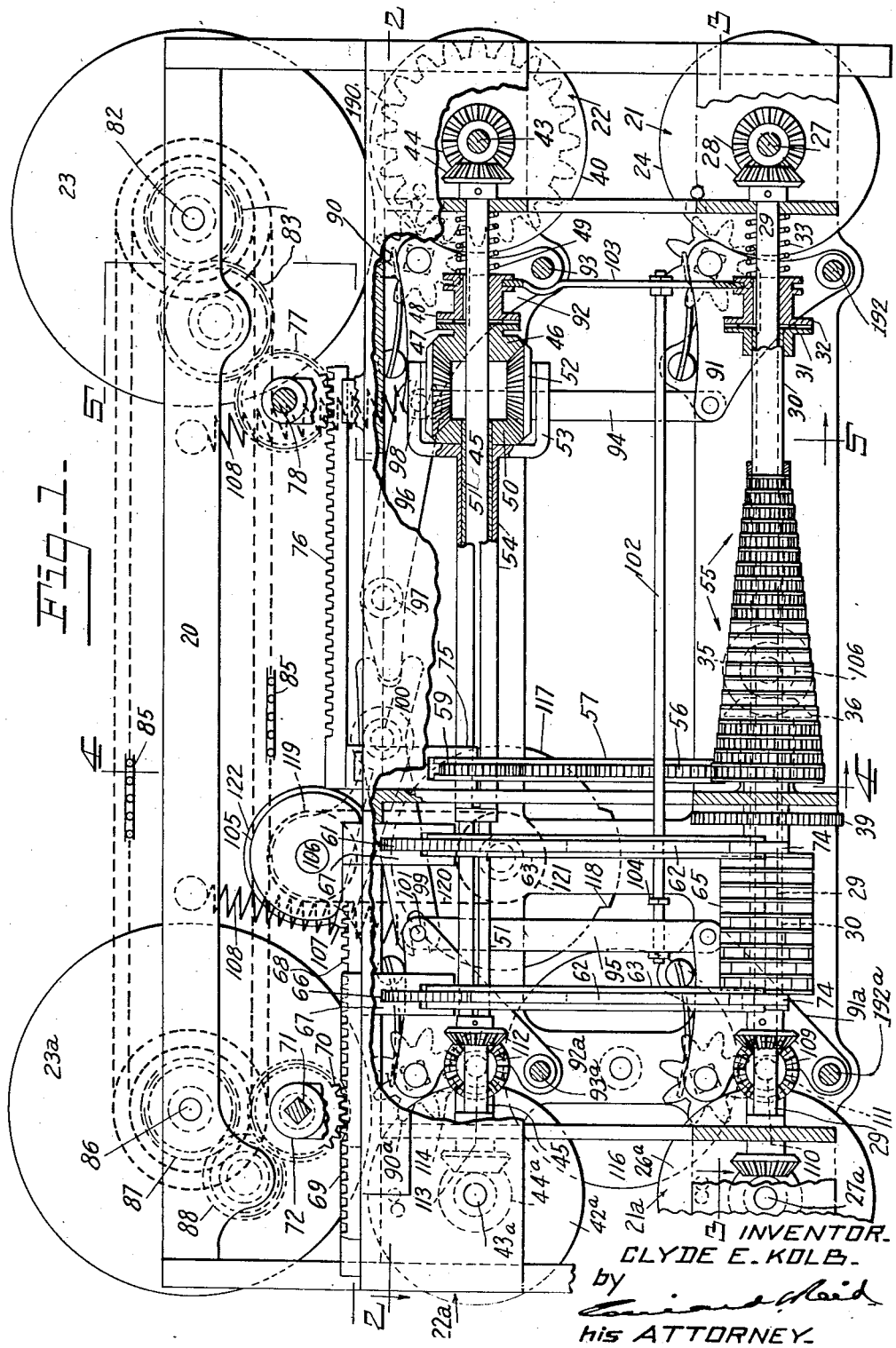

Nov. 5, 1940.  C. E. KOLB  2,220,159
PRICE COMPUTING MECHANISM
Filed April 22, 1937  5 Sheets-Sheet 3
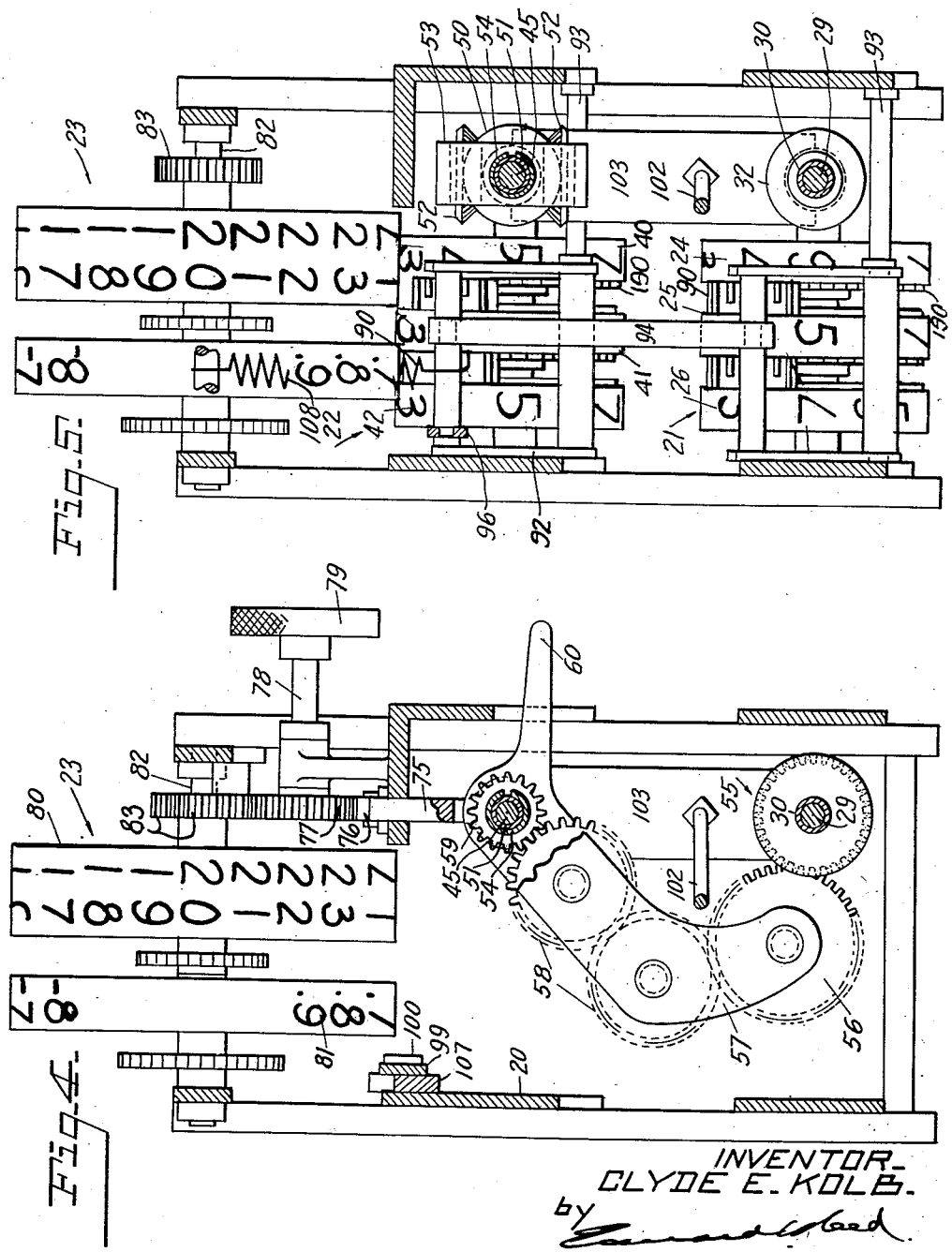
INVENTOR
CLYDE E. KOLB.
by
his ATTORNEY.

Nov. 5, 1940.  C. E. KOLB  2,220,159
PRICE COMPUTING MECHANISM
Filed April 22, 1937   5 Sheets-Sheet 4
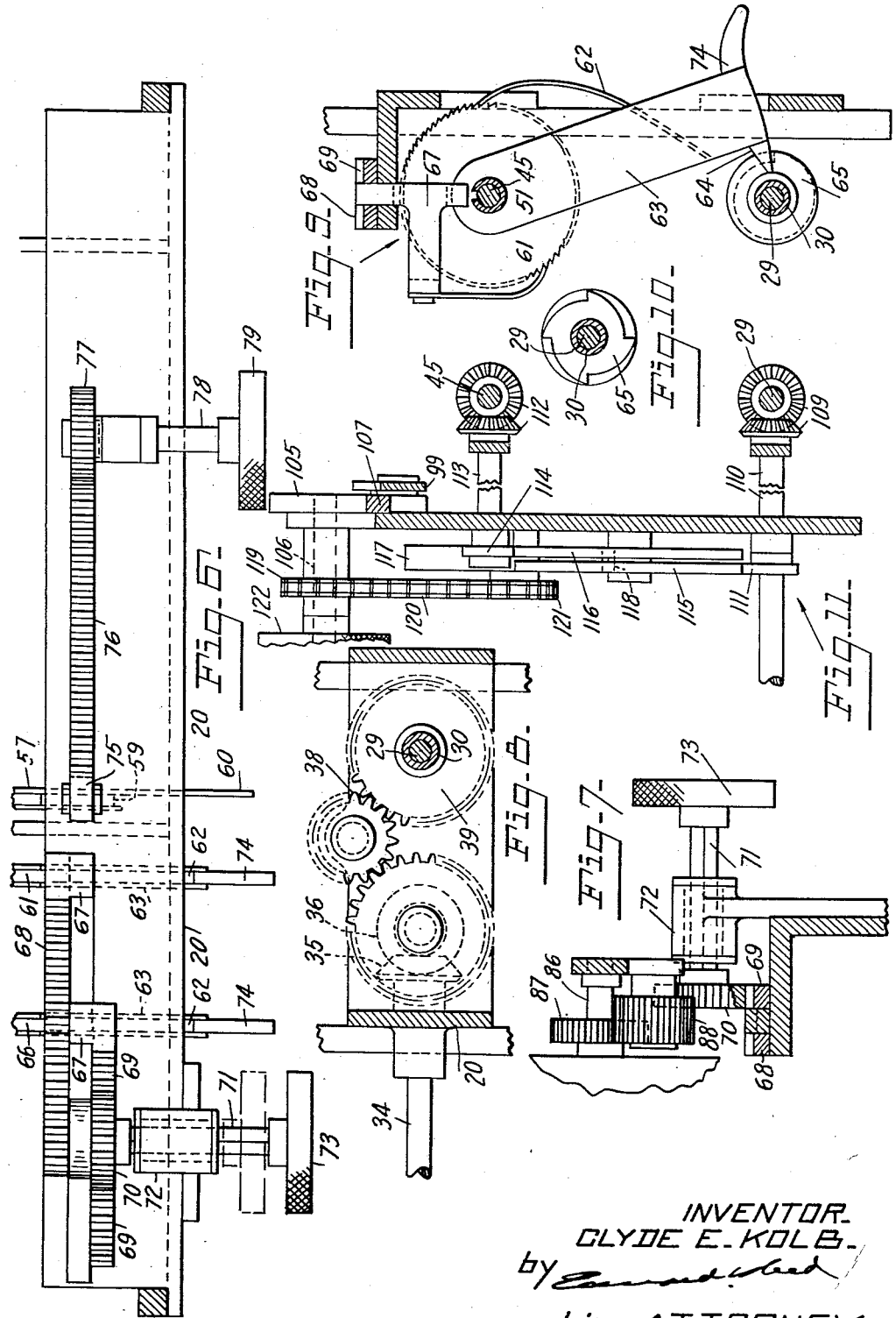
INVENTOR.
CLYDE E. KOLB.
by
his ATTORNEY.

Nov. 5, 1940.   C. E. KOLB   2,220,159
PRICE COMPUTING MECHANISM
Filed April 22, 1937   5 Sheets-Sheet 5
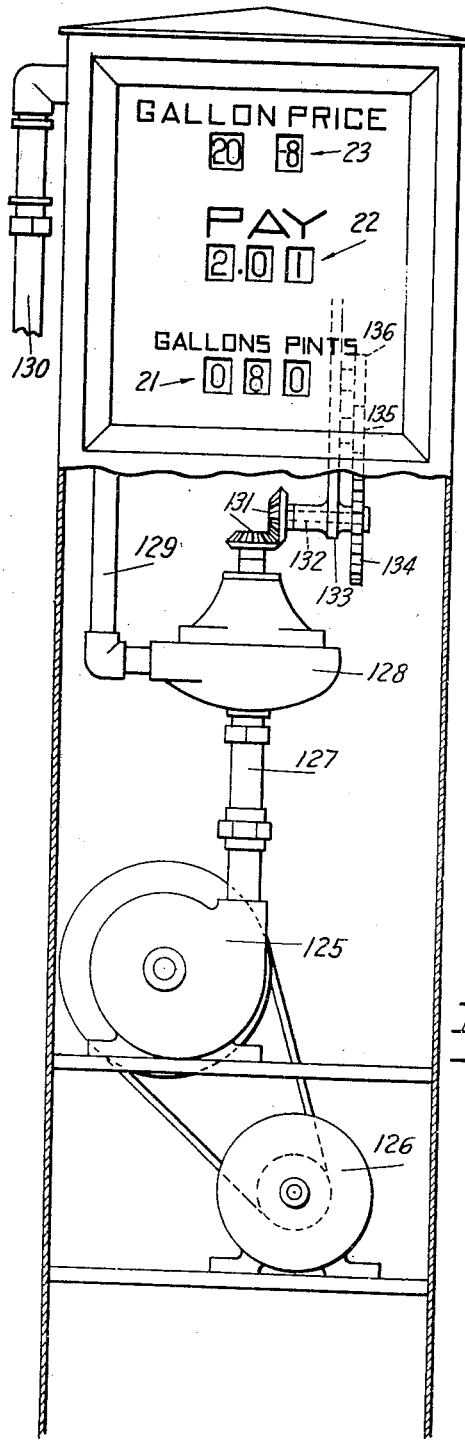
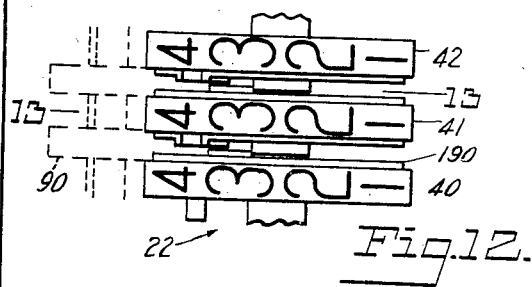
Fig.12.
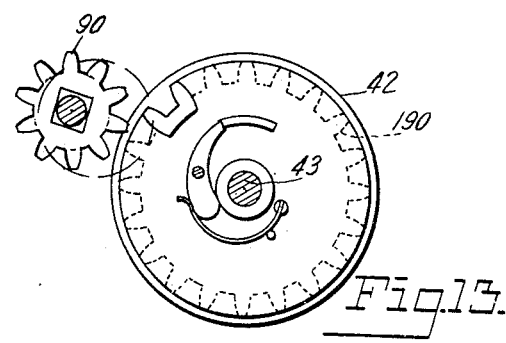
Fig.13.
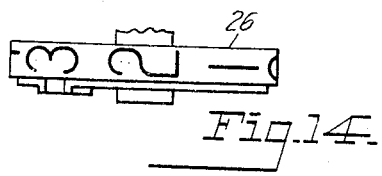
Fig.14.
Fig.15.
INVENTOR.
CLYDE E. KOLB.
by
his ATTORNEY.

Patented Nov. 5, 1940

2,220,159

UNITED STATES PATENT OFFICE 2,220,159

PRICE COMPUTING MECHANISM

Clyde E. Kolb, Dayton, Ohio, assignor to The Wayne Pump Company, Fort Wayne, Ind., a corporation of Maryland Application April 22, 1937, Serial No. 138,420

14 Claims. (Cl. 74—283)

This invention relates to a price computing mechanism for use with a commodity dispensing apparatus and is designed more particularly for use with an apparatus for dispensing a commodity, such as gasoline, which is subject to more or less frequent price changes and the price per unit of which frequently includes a fraction of a cent.

One object of the invention is to provide a mechanism which will accurately compute and register the total price or value of the dispensed commodity at a selected price per unit, which per unit price may include whole cents only or both whole cents and a fraction of a cent.

A further object of the invention is to provide such a mechanism with a simple and efficient means for effecting the computation on a price per unit including a fraction of a cent.

A further object of the invention is to provide such a mechanism with means for effecting the computation at a price per unit including a fraction in either of two denominations, such as tenths or eighths.

A further object of the invention is to provide means whereby the registering devices may be quickly and easily reset to zero upon the completion of each dispensing operation.

A further object of the invention is to provide such a mechanism with automatically controlled means for accurately indicating to the customer the price per unit upon which the computation is effected.

Other objects of the invention may appear as the mechanism is described in detail.

In the accompanying drawings Fig. 1 is a side elevation, partly broken away, of a computing mechanism embodying my invention; Fig. 2 is a plan view of the computing mechanism, omitting the price per unit indicators; Fig. 3 is a plan view of the actuating device showing portions of the selecting mechanisms; Fig. 4 is a transverse section taken on the line 4—4 of Fig. 1, looking in the direction of the arrows and partly broken away; Fig. 5 is a transverse section taken on the line 5—5 of Fig. 1, looking in the direction of the arrows; Fig. 6 is a detail view of the adjusting devices for the whole cent and fraction of a cent selecting mechanisms; Fig. 7 is a sectional detail view of the adjusting device for the fraction of a cent selecting mechanism; Fig. 8 is a detail view of the driving means for the actuating device; Fig. 9 is a detail view of one of the controlling devices for effecting the computation in accordance with a fraction of a cent; Fig. 10 is a detail view of one of the actuating cams for the device shown in Fig. 9; Fig. 11 is a detail view of a portion of the resetting mechanism; Fig. 12 is a plan view of one group of price counters; Fig. 13 is a section on the line 13—13 of Fig. 12; Fig. 14 is a plan view of one of the quantity counters; and Fig. 15 is an elevation, partly in section, of a gasoline pump having the computing mechanism installed therein.

In these drawings I have illustrated one embodiment of my invention and have shown the same in the form adapted to be installed in dispensing apparatuses of various kinds, such as gasoline pumps manufactured by different manufacturers. The mechanism as shown is self-contained and is adapted to be built into dispensing apparatus when the latter is manufactured or to be installed in an existing dispensing apparatus.

In this embodiment of the invention the mechanism as a whole is carried by a main supporting frame 20, which may be of any suitable character. The registering and indicating devices are duplicated at opposite ends of the frame so that the computations and indications may be read from either side of the apparatus. In the arrangement shown the mechanism comprises a device 21 for registering the quantity of the commodity dispensed and this device is duplicated at the opposite end of the frame, as shown at 21a, the two registering devices being actuated in unison as will be hereinafter described. Devices for registering the computed price are also arranged at the respective ends of the frame, as shown at 22 and 22a, and are actuated in unison. Devices for indicating the price per unit at which the computation is effected are also arranged at the respective ends of the frame, as shown at 23 and 23a, and are actuated in unison.

The quantity register 21 comprises a plurality of counterwheels 24, 25 and 26, as shown in Fig. 5, mounted on a countershaft 27, Figs. 1 and 3, which is journaled in suitable bearings carried by the main frame. The quantity register 21a comprises counterwheels 24a, 25a and 26a mounted on a countershaft 27a. These quantity counters are adapted to register measured units, of the commodity dispensed and fractions thereof. The registers 21 and 21a being duplicates the following description will refer to register 21 only. The present mechanism is adapted to register in gallons and the counterwheels 25 register in units of gallons and the counterwheels 24 in tens of gallons. The counterwheel 26 registers in fractions of gallons, or pints, and therefore bears the numerals 1 to 7 and 0. The counterwheel of lowest denomination, in the present instance the fraction counterwheel, is rigidly secured to the countershaft 27 and this countershaft is connected by gears 28 with a shaft 29 which is driven by suitable actuating mechanism.

In the preferred arrangement a single shaft 29 extends lengthwise of the main frame and is connected with the countershafts of both quantity registers so that the two registers will be actuated in unison.

The actuating means for the shaft 29 and the quantity register preferably comprises a shaft 30 operatively connected with the shaft 29. For the sake of simplicity and compactness of construction the actuating shaft is here shown as tubular in form and as rotatably mounted on the shaft 29 but it is normally rigidly connected with that shaft by a clutch comprising a clutch member 31 secured to the actuating shaft at one end thereof and a second clutch member 32 splined to the shaft 29 and held normally in engagement with the clutch member 31 by a spring 33. The actuating shaft 30 is operated from the dispensing apparatus so that a predetermined movement will be imparted thereto for each unit of the commodity which is dispensed by said apparatus. In the present construction a shaft 34, which constitutes the main actuating device for the apparatus is rotatably mounted on the main frame and is adapted to be connected with the measuring mechanism of the dispensing apparatus, such as the meter of a gasoline pump, so that the rotation of the shaft 34 will be controlled in accordance with the quantity of the commodity which is dispensed. The dispensing apparatus is shown in Fig. 15 as a gasoline pump of conventional construction and comprises a pump 125 driven by a motor 126, the discharge pipe 127 of the pump being connected with the inlet of a meter 128, the outlet of which is connected by a pipe 129 with the delivery hose 130. The meter is connected by beveled gearing 131 with a shaft 132 journaled in a bearing 133 and having secured thereto a gear 134. The gear 134 is connected by an intermediate gear 135 with a gear 136 secured to the shaft 34. The shaft 34 is provided on its inner end with a beveled pinion 35 meshing with a beveled pinion 36 to which is rigidly secured a gear 37 which is connected through an intermediate gear 38 with a gear 39 rigidly secured to the actuating shaft 30, the ratio of the gearing being such, in the present instance, that the actuating shaft will make a single complete rotation for each unit of the commodity dispensed by the dispensing apparatus. This movement of the actuating shaft is transmitted through the shaft 29 and countershaft 27 to the fraction counterwheels 26 of the quantity registers and each of these wheels will make a complete rotation for each full unit of the commodity which is dispensed. By means of suitable transfer mechanism, which will be hereinafter described, the count is transferred from the fraction counterwheels 26 to the units of gallons counterwheels 25 and from the counterwheels 25 to the tens of gallons counterwheels 24, and at the end of each dispensing operation each quantity register will accurately indicate the total quantity of the commodity which was dispensed by that operation. The movement of the actuating shaft 30 is also transmitted to the shaft 27a of the quantity register 21a through the shaft 29 and gears 28a. The computed price register 22 at the right hand end of the apparatus, as shown in the drawings, includes a plurality of counterwheels 40, 41 and 42, mounted on a countershaft 43, and a register 22a at the left hand end of the apparatus includes the counterwheels 40a, 41a and 42a mounted on the countershaft 43a. These registers are adapted to register the computed price in dollars and cents and inasmuch as they are duplicates one only will be described. In the register 22 the counterwheel 40 constitutes the units of cents counter, the counterwheel 41 the tens of cents counter, and the counterwheel 42 the dollar counter. The counterwheel of lowest denomination, that is the units of cents counterwheel 40, is rigidly secured to the countershaft 43 for rotation therewith and the count is transferred by suitable transfer mechanism to the counterwheel 41 and from the counterwheel 41 to the counterwheel 42. This device will register any value up to $9.99 but obviously its capacity can be increased by adding additional dollar counterwheels. The countershaft 43 is connected by a beveled gear 44 with a shaft 45. In the present construction a single shaft extends lengthwise of the frame and is connected with the countershaft 43a by gears 44a.

The price registers are actuated by a suitable computing mechanism which, in the present arrangement, is operatively connected with the shaft 45, this computing mechanism being controlled by the dispensing apparatus in such a manner that it will compute the total value or price of the dispensed commodity at a selected price per unit. Preferably the computing device includes differential gearing of such a character that the operation thereof may be controlled and varied in accordance with a fraction of a cent forming a part of the price per unit. This computing device may be mounted in any suitable location and connected with the registering devices in any suitable manner but for the sake of simplicity and compactness in construction it is here shown as mounted on and operatively connected with the shaft 45. The differential gearing includes a beveled gear 46 rotatably mounted on the shaft 45 and normally connected therewith for rotation in unison therewith by a clutch comprising a clutch member 47 secured to the gear 46 and a clutch member 48 splined to the shaft 45 and held normally in engagement with the clutch member 47 by a spring 49. A second beveled gear 50 is rotatably mounted on the shaft 45 in opposed and spaced relation to the gear 46 but is held normally against rotation, it being in the present instance rigidly secured to a tubular shaft 51 mounted on the shaft 45. Planetary gears 52 mesh with both the gear 46 and the gear 50 and are carried by a yoke 53 rigidly secured to a tubular shaft 54 rotatably mounted on the shaft 51. Thus the rotation of the shaft 54 will cause the planetary gears to travel about the common axis of the gears 46 and 50 and to impart to the gear 46 a movement which is controlled by the gear 50, the rotation of this gear in one direction serving to increase the movement imparted to the gear 46 and the rotation of the gear 50 in the other direction serving to decrease the movement imparted to the gear 46, and the movement of the gear 46 is transmitted directly to the price registering devices through the shaft 45.

The shaft 54 and the planetary gears carried thereby are preferably actuated from the actuating device or shaft 30 and adjustable means are provided for so connecting the shaft 30 with the shaft 54 that the movement imparted to the latter may be controlled in accordance with different prices per unit. In the construction here shown a series of stepped gears 55 are rigidly secured to the actuating shaft for rotation therewith, each gear having a number of teeth corresponding to a price per unit or to the whole cents part of such price. In the present instance, there are twenty-one of these price per unit gears, the smallest gear having ten teeth and the largest gear having thirty teeth, thus providing a price range from 10¢ to 30¢ per unit. Associated with these stepped price per unit gears is a selecting gear 56 adapted to be moved into operative relation to any one of the price per unit gears 55. Preferably this selecting gear is mounted on a swinging frame or carrier 57 which is pivotally and slidably mounted on the shaft 54, and the selecting gear is connected through intermediate gears 58 with a gear 59 rigidly secured to the shaft 54. Thus by moving the selecting gear out of engagement with the group of price per unit gears and moving the frame 57 lengthwise of the shaft 54 the selecting gear may be brought into operative engagement with any one of the price per unit gears and the ratio of the gearing between the price per unit gear and the shaft 54 is such that the movement imparted to the shaft 54 upon each complete rotation of the selected price per unit gear will cause the differential gearing to advance the price registering device an amount corresponding to the value of the selected price per unit gear. For convenience of operation the swinging frame 57 is provided with a handle 60 which projects beyond the side of the main frame. Thus upon each complete rotation of the actuating shaft the price register will be actuated to add thereto the whole cents part of the price of one unit and if the price per unit does not include a fraction this will effect the complete computation of the price.

When the price per unit includes a fraction the computation effected by the operation of the differential gearing by the actuating shaft is varied so as to add thereto the value of the fractional part of the price per unit. In the present mechanism this is accomplished by imparting to the normally stationary gear 50 a movement corresponding to the value of the fraction which is to be added, thus causing a correspondingly increased movement to be imparted to the gear 46 and the register. As here shown, this variation of the operation of the differential gearing is effected by means of a controlling member 61 connected with the normally stationary gear 50 and preferably mounted on the shaft 51 which carries that gear. Selective means controlled by the actuating shaft are provided for imparting to the controlling member 61 and the normally stationary gear 50 a movement corresponding to the fractional part of the price per unit, upon each complete rotation of the actuating shaft. In the construction illustrated, the controlling member comprises a ratchet wheel which is actuated by a pawl 62 mounted on a pawl carrier 63 which has at its lower end a projection or tooth 64 adapted to be engaged and actuated by a cam 65 which is rotated by the actuating shaft. There are a series of these cams 65 each having a different number of cam lobes and they are here shown as mounted on and rigidly secured to the actuating shaft. The controlling member 61 and pawl carrier 63 are adustable lengthwise of the shaft 51 so that the pawl carrier may be moved into operative relation to any one of the cams 65. When the pawl carrier is in operative relation to the cam corresponding to the fractional part of the price per unit that cam will make one complete rotation for each unit of commodity which is dispensed and will impart to the controlling member 61 and to the normally stationary gear 50 a reverse movement corresponding to the fractional part of the price. If the selected cam has a plurality of lobes this movement will be imparted to the controlling member in a series of steps or short movements. Inasmuch as the cams which actuate the controlling member are driven by the actuating shaft it will be apparent that the reverse movement of the normally stationary gear 50 of the differential gearing takes place during the operation of that gearing by the selected price per unit gear 65, so that the movement imparted to the gear 46 and to the register is the result of the combined action of the price per unit gear 55 and the actuating cam 65. The number of teeth provided on the ratchet forming part of the controlling device is determined in part by the denomination of the fraction which is to be added to the computation and the controlling member or ratchet wheel 61 shown in Figs. 1 and 9 is adapted to register eighths of a cent and is provided with eighty teeth. The arrangement of the pawl carrier and actuating cams is such that each lobe of the cam which acts on the pawl carrier will advance the controlling member one tooth, the total movement imparted to the controlling member being determined by the number of lobes in the cam, which progressively increase from 1 to 7.

In some localities the price per unit of gasoline, when it includes a fraction of a cent, is fixed in tenths of a cent and in other localities it is fixed in eighths of a cent. In order that the present apparatus may be adapted to compute fractional values of either denomination I have provided a second controlling member 66 connected with the normally stationary gear 50 and controlled by the actuating shaft 30 in the manner described in connection with the controlling member 61, but this second controlling member is adapted to register in tenths instead of in eighths and is, in the present instance, provided with one hundred teeth. Thus each lobe of the selected actuating cam will impart to the controlling member 66 a movement slightly less than that imparted by the same cam to the controlling member 61 and this movement so varies the operation of the differential gearing that a tenth of a cent will be added to the computation for each lobe of the selected cam. Preferably the same group of actuating cams is employed for actuating both controlling members and for that reason I have shown in Fig. 1 nine such actuating cams. It will be understood, of course, that only one controlling member is used at one time and the other is moved into an inoperative position. So long as the price remains fixed in the same denomination of fractions the second controlling device will not be used but should the price be changed to another fractional denomination or should the mechanism be transferred to a location in which the price was fixed in the other fractional denomination then the second controlling device would be used and the first one moved to an inoperative position.

Both controlling devices are shown in Figs. 1 and 9 as in their inoperative positions, that is, moved beyond the respective ends of the group of actuating cams, and with the controlling devices in these positions the operation of the computing mechanism is in accordance with the whole cent price per unit. For the purpose of adjusting the controlling members to cam selecting positions each controlling member and its pawl carrier are embraced by a yoke 67, which yokes are rigidly connected respectively to toothed racks 68 and 69 slidably mounted upon the main frame and adapted to be separately operated to adjust the positions of the respective controlling members. A pinion 70 is adapted to be moved into operative engagement with either rack for actuating the same and, as here shown, that pinion is carried by a shaft 71 rotatably and slidably mounted in a bearing 72 and provided with an operating knob 73, as shown in Figs. 6 and 7. Thus when the pinion is in mesh with the rack 69 the controlling member 66 will be adjusted by the rotation of the knob and when the pinion is moved into engagement with the rack 68 the controlling member 61 will be adjusted by the rotation of that knob. It will be understood, of course, that before the adjusting means is actuated the pawl carrier is moved outwardly to a position in which the tooth 64 thereof will clear the cams as the pawl carrier is moved axially thereof and for this purpose the pawl carrier may be provided with a finger piece 74.

Means are also provided for facilitating the adjustment of the selecting gear 56 which cooperates with the price per unit gear 55 and, as shown in Fig. 4, the upper end of the swinging frame 57 and the gear 59 are embraced by a yoke 75 rigidly secured to a rack 76 slidably mounted upon the frame and meshing with a pinion 77 which is carried by a shaft 78 provided with an actuating knob 79.

The price per unit indicators are automatically adjusted by the operation of the adjusting devices to select the price per unit which is to be used. Each of the price per unit indicators 23 and 23a includes two separately adjustable indicating elements or drums 80 and 81. The drum 80 carries numerals corresponding to the whole cents part of the price per unit and the drum 81 carries numerals corresponding to the fractional part of the price per unit. When the mechanism is provided with means for computing price upon either of two denominations of fractions the drum 81 will carry on one side of its peripheral surface fractions of one denomination and on the other side thereof fractions of the other denomination. In order that the indications may be read from either side of the machine it is necessary that the relative positions of the two drums 80 and 81 should be reversed at the opposite ends of the frame. In Figs. 4 and 5 the two drums of indicator 23 are viewed from their inner sides looking toward the right hand end of the frame in Fig. 1 but as seen by an observer facing either indicator, 23 or 23a, the drum 80 will be on the left and the drum 81 on the right. Thus the drum 80 of each indicator will be in line with the drum 81 of the other indicator. These indicator drums are actuated by the setting pinions of the two adjusting devices, and the indicator shaft 82, which carries the indicator drums 80 and 81 at the right hand end of the frame in Fig. 1, is connected by gears 83, with the adjusting pinion 77 for the selecting gear 56. The drum 80, which indicates whole cents, is rigidly secured to the shaft 82 and the ratio of the gearing is such that it will be adjusted to indicate the money value in cents of the price per unit gear which has been selected. This shaft 82 is connected, as by a sprocket chain 85, to the drum 80 at the opposite end of the frame, this last mentioned drum being rotatably mounted on the indicator shaft 86. The fractions indicator, the drum 81, at the left hand end of the machine, in Fig. 1, is rigidly secured to the shaft 86 and this shaft is connected by gears 87 and 88 with the adjusting pinion 71 for the controlling members 61 and 66, the gear 88 being of such length that the pinion 70 will remain in mesh therewith in either position of the pinion 70. The fraction indicator drum at the right hand end of Fig. 1 is loosely mounted on the shaft 82 and is connected with the shaft 86 for rotation thereby in unison with the fraction indicating drum at the left hand end of the machine, this being preferably accomplished by a sprocket chain connection. It will thus be apparent that any adjustment of either the whole cents price selecting mechanism or the fraction of a cent price selecting mechanism will be positively transmitted to the price per unit indicators so that the latter will at all times accurately indicate the price per unit which is being used in the computations.

As has been heretofore stated each of the registers comprises a plurality of counterwheels, the counterwheel of lowest denomination being actuated directly from the countershaft and the count being transferred from each counterwheel of lower denomination to the counterwheel of next higher denomination. The means for effecting this transfer are of a well known character and need not be here described, except to state that the transfer mechanism for each register includes a plurality of transfer pinions 90 and 90a which normally mesh with gears 190 and 190a on the respective counterwheels and which are moved to inoperative positions to permit the resetting of the registers to zero. As here shown, these pinions are rotatably mounted upon supporting frames, the transfer pinions for the quantity registers being mounted on swinging frames 91 and 91a pivotally mounted at their lower ends on the main frame, as shown at 192 and 192a. The transfer pinions for the price counters are carried by swinging frames 92 and 92a pivotally mounted at their lower ends on the main frame at 93 and 93a. The arrangement of these frames is such that when they are moved inwardly and downwardly about their respective axes the transfer pinions will be moved to inoperative positions. The swinging frames 91 and 92 are connected one to the other by a link 94 and the swinging frames 91a and 92a are connected one to the other by a link 95 so that the frames of each pair will move in unison. A lever 96 is pivotally mounted on the main frame at 97 and is connected at its outer end with the swinging frame 92, as shown at 98. A second lever 99 is pivotally mounted on the main frame at 100 and is pivotally connected with the swinging frame 92a at 101. The two levers are connected one to the other in such a manner that they will move simultaneously about their axes but in opposite directions, so that the outer ends of the two levers will move upwardly and downwardly in unison, thus transmitting corresponding movements to the four swinging frames. The movement of these levers also serves to actuate the clutches to disconnect the shaft 29 from the actuating shaft and to disconnect the shaft 45 from the computing mechanism. It will be apparent that the movement of the frames of either pair about their axes will cause the connecting link to move lengthwise of the frame.

A rod 102 is connected at one end with the link 95 and is connected at its other end with a bar 103 which is connected with the movable clutch members 32 and 48 so that when the frames are swung to their lower positions the clutch members will be moved to their inoperative positions, thereby completely releasing the counterwheels of the several registers for free rotation. In view of the fact that the link 95 has a considerable movement I have provided a lost motion connection between the rod 102 and that link, as shown at 104, to avoid undue compression of the clutch springs. The levers may be thus actuated to release the several counterwheels for resetting movement, in any suitable manner and, in the present construction, I have provided for this purpose a cam 105 secured to a stud shaft 106 which is rotatably mounted in the frame. This cam acts upon an arm 107 which is rigidly connected with the lever 99 adjacent the axis thereof. The cam 105 has a flattened surface on one side thereof and when this flat surface is adjacent the arm 107 the levers will be moved to and held in their elevated positions by a spring 108 connected with the swinging frame 92a and with a fixed part of the frame. When a partial rotation is imparted to the cam the arm 107 will be actuated and the levers 96 and 99 moved about their axes to effect the release of the counterwheels. When the counterwheels have been released they may be reset in any suitable manner during the time that the cam is in operative engagement with the lever actuating arm. In the present instance, the counterwheels are reset by rotating the shafts 29 and 45 each in a reverse direction, thereby rotating the counterwheels of lowest denomination in a reverse direction. The counterwheels of each register are provided with means of a well known character whereby each counterwheel of a lower denomination, when moved in a reverse diretcion, will pick up the counter of the next higher denomination, thus causing all the counterwheels to be rotated to their zero positions, where their movement is automatically stopped. In the present construction the shaft 29 is connected by means of beveled gears 109 with a transverse shaft 110, arranged near the left hand end of the machine, as shown in Fig. 1, and this shaft is provided with a friction disk 111. The shaft 45 is connected by beveled gears 112 with a transverse shaft 113 which carries a friction disk 114, as shown in Fig. 11. Cooperating with the friction disks 111 and 114, respectively, are relatively large friction disks 115 and 116 mounted on a frame for rotation about a common axis and being of the same diameter. The friction disks 115 and 116 are actuated by a rotatable member 117 having a peripheral projection 118 arranged to engage the peripheries of both the friction disks 115 and 116 and impart rotary movement thereto, which movement is transmitted through the friction disks 111 and 114 to the shafts 29 and 45 respectively. The actuating member 117 is operated during the rotation of the cam 105 and is preferably operated by the actuating means for that cam. As here shown, the cam supporting shaft 106 has secured thereto a sprocket wheel 119 which is connected by a sprocket chain 120 with a sprocket wheel 121 secured to the actuating member 117, thereby causing the cam and actuating member to rotate in unison. The projection 118 on the actuating member is so arranged with relation to the cam that it will engage the friction disks 115 and 116 after the cam has operated to release the counterwheels and will be moved out of engagement with said friction disks before the cam reaches a position to permit the return of the transfer gears to their operative positions. Thus the rotation of the cam supporting shaft 106, which may be accomplished by a knob 122, will release the counterwheels, reset the same and then restore the operative connections for the counterwheels.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus comprising a device to be actuated and an actuating device, a gear connected with said device to be actuated, a normally stationary gear in axial alinement with the first mentioned gear, a planetary gear meshing with both the first mentioned gears, means driven by said actuating device to rotate said planetary gear about the axis of the first mentioned gears, a controlling member connected with said stationary gear, a plurality of cams connected with said actuating device for rotation thereby, and means adjustable into operative relation to a selected cam for operation thereby to impart movement to said controlling member and to said normally stationary gear to vary the movement imparted to said first mentioned gear by said planetary gear, each cam being adapted to impart a different movement to said controlling member.

2. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, a plurality of members connected with said differential gearing and separately operable to modify the movement imparted to said differential gearing by said adjustable means, and means for individually connecting said members with said actuating device for operation thereby in timed relation to the operation of said adjustable means.

3. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, a plurality of members connected with said differential gearing and separately operable to modify the movement imparted to said differential gearing by said adjustable means, a plurality of actuating members connected with said adjustable means for operation thereby, separate means for connecting the respective first mentioned members with a selected one of said actuating members, and means for preventing the simultaneous connection of said first mentioned members with said actuating members.

4. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, a ratchet wheel connected with said differential gearing to increase the movement imparted to the latter by said adjustable means, a cam connected with said adjustable means for operation thereby, a pawl supported in operative relation to said ratchet wheel, and means actuated by said cam for operating said pawl.

5. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, two members connected with said differential gearing to modify the movement imparted to the latter by said adjustable means, an actuating member connected with said actuating device for operation thereby in timed relation to the operation of said adjustable means, and means for separately connecting the first mentioned members with said actuating member.

6. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, two members connected with said differential gearing to modify the movement imparted to the latter by said adjustable means, said members being axially adjustable with relation one to the other, a plurality of rotatable actuating members connected with said actuating device for rotation thereby in timed relation to the operation of said adjustable means, and separate means for connecting the first mentioned members with a selected actuating member, said connecting means being adjustable in unison with the respective first mentioned members to move the same into operative relation to the selected actuating member.

7. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, two members connected with said differential gearing to modify the movement imparted to the latter by said adjustable means, said members being axially adjustable with relation one to the other, a plurality of rotatable actuating members connected with said actuating device for rotation thereby in timed relation to the operation of said adjustable means, connecting devices associated with the respective first mentioned members and adjustable therewith, means for adjusting said first mentioned members to move the connecting device of one of said members into operative relation with a selected actuating member and to move the connecting device for the other of said members into inoperative relation to all of said actuating members.

8. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, two members connected with said differential gearing to modify the movement imparted to the latter by said adjustable means, said members being axially adjustable with relation one to the other, a plurality of rotatable actuating members connected with said actuating device for rotation thereby in timed relation to the operation of said adjustable means, connecting devices associated with the respective first mentioned members and adjustable therewith, means for adjusting said first mentioned members to move the connecting device of one of said members into operative relation with a selected actuating member and to move the connecting device for the other of said members into inoperative relation to all of said actuating members, an indicator, and means actuated by said adjusting means for adjusting said indicator in accordance with the adjustment of the first mentioned members.

9. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, two members connected with said differential gearing, and separately operable to modify the movement imparted to said gearing by said adjustable means, a plurality of actuating members connected with said actuating device for operation thereby in timed relation to the operation of said adjustable means, means for separately connecting either of the first mentioned members with a selected one of said actuating members, an indicator, and means controlled by said connecting means to adjust said indicator in accordance with the connection established by said connecting means.

10. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, two members connected with said differential gearing, and separately operable to modify the movement imparted to said gearing by said adjustable means, a plurality of actuating members connected with said actuating device for operation thereby in timed relation to the operation of said adjustable means, means for separately connecting either of the first mentioned members with a selected one of said actuating members, an indicator comprising two separately operable parts, means controlled by the adjustment of said adjustable means to adjust one part of said indicator, and means controlled by said connecting means to adjust the other part of said indicator.

11. In an apparatus comprising a device to be actuated and an actuating device, differential gearing operatively connected with the device to by actuated, means actuated by said actuating device to impart to said differential gearing a predetermined movement in accordance with the movement of said actuating device, said means being adjustable to vary the amount of movement imparted to said differential gearing by a given movement of said actuating device, members connected with said differential gearing and separately operable to modify the movement imparted to said differential gearing by said adjustable means, operative means for individually connecting said members with said actuating device for operation thereby in timed relation to the operation of said adjustable means, rotatable means for selectively setting said first named means and said operative means, and indicating means for showing said setting, said indicating means being operated by said rotatable means.

12. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, members connected with said differential gearing and separately operable to modify the movement imparted to said differential gearing by said adjustable means, operative means for individually connecting said members with said actuating device for operation thereby in timed relation to the operation of said adjustable means, setting means for selectively setting said first named means and said operative means, and indicating means for showing said setting.

13. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, members connected with said differential gearing to modify the movement imparted to the latter by said adjustable means, an actuating member connected with said actuating device for operation thereby in timed relation to the operation of said adjustable means, means for separately connecting the first mentioned members with said actuating member, and indicating means for showing the adjustment of said first named means and said first named members.

14. In an apparatus comprising a device to be actuated and an actuating device, differential gearing operatively connected with the device to be actuated, means actuated by said actuating device to impart to said differential gearing a predetermined movement in accordance with the movement of said actuating device, said means being adjustable to vary the amount of movement imparted to said differential gearing by a given movement of said actuating device, two members connected with said differential gearing to modify the movement imparted to the latter by said adjustable means, said members being axially adjustable with relation one to the other, a plurality of rotatable actuating members connected with said actuating device for rotation thereby in timed relation to the operation of said adjustable means, separate means for connecting the first mentioned members with a selected actuating member, said connecting means being adjustable in unison with the respective first mentioned members to move the same into operative relation to the selected actuating member, and indicating means for showing the setting by which said differential gearing will be operated.

CLYDE E. KOLB.